(12) United States Patent
Hamaguchi et al.

(10) Patent No.: US 7,866,154 B2
(45) Date of Patent: Jan. 11, 2011

(54) MANUFACTURING APPARATUS AND MANUFACTURING METHOD

(75) Inventors: Kouji Hamaguchi, Osaka (JP); Junichi Tanii, Izumi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1379 days.

(21) Appl. No.: 11/346,940

(22) Filed: Feb. 3, 2006

(65) Prior Publication Data
US 2006/0185359 A1    Aug. 24, 2006

(30) Foreign Application Priority Data
Feb. 10, 2005    (JP) .................... 2005-034149

(51) Int. Cl.
*F01B 29/00* (2006.01)
*B21D 39/00* (2006.01)

(52) U.S. Cl. ..................... 60/528; 60/527; 29/452; 29/447

(58) Field of Classification Search ........... 60/527, 60/528; 29/452, 447, 446
See application file for complete search history.

(56) References Cited

U.S. PATENT DOCUMENTS

| | | | | |
|---|---|---|---|---|
| 4,517,735 A * | 5/1985 | Watkins | ............... | 29/621 |
| 4,579,006 A * | 4/1986 | Hosoda et al. | ......... | 73/862.381 |
| 4,716,731 A * | 1/1988 | Sakai et al. | ............... | 60/527 |
| 5,345,963 A * | 9/1994 | Dietiker | ............... | 137/12 |
| 5,684,448 A * | 11/1997 | Jacobsen et al. | ......... | 337/140 |
| 6,374,608 B1 * | 4/2002 | Corris et al. | ............... | 60/528 |
| 6,404,098 B1 * | 6/2002 | Kayama et al. | ............ | 310/307 |
| 6,434,333 B2 * | 8/2002 | Tanaka et al. | ............... | 396/132 |
| 6,574,958 B1 * | 6/2003 | MacGregor | ............... | 60/527 |
| 6,588,088 B2 * | 7/2003 | Dondiz et al. | ............... | 29/593 |
| 6,851,260 B2 * | 2/2005 | Mernøe | ............... | 60/527 |

(Continued)

FOREIGN PATENT DOCUMENTS

EP    1 491 230 A2    12/2004

(Continued)

OTHER PUBLICATIONS http://www.fitec.co.jp/ftm/nt/lib/furu-nt1.htm, "Technical Literature on Shape Memory Alloys and Superelastic Alloys" (Furukawa NT Alloys), with an English-language translation thereof.

(Continued)

*Primary Examiner*—Essama Omgba
(74) *Attorney, Agent, or Firm*—Sidley Austin LLP

(57) ABSTRACT

An assembling apparatus (manufacturing apparatus) can assemble an actuator (product) in which a shape memory alloy (SMA) is stretched. In the assembly, the SMA is locked by a first holder, a guide is moved along predetermined movement directions while sending the SMA and, after that, the SMA is locked by a second holder. A switch is turned on to pass current from a current source to the SMA via an electrode. The SMA is fixed to two electrodes by caulking members and, after that, an unnecessary portion of the SMA is cut. In such a manner, the actuator is manufactured. Since the SMA is tensioned while current is passed to the SMA as described above, the stretch can be stably performed while suppressing elongation of the SMA. As a result, a product can be manufactured with high quality.

31 Claims, 9 Drawing Sheets

U.S. PATENT DOCUMENTS

| | | | |
|---|---|---|---|
| 6,981,374 B2 * | 1/2006 | von Behrens et al. | 60/527 |
| 7,073,332 B2 * | 7/2006 | Butera et al. | 60/527 |
| 7,395,825 B2 * | 7/2008 | Dirnberger et al. | 134/94.1 |
| 7,451,595 B2 * | 11/2008 | Komori et al. | 60/527 |
| 7,481,054 B2 * | 1/2009 | Hageman et al. | 60/527 |
| 7,555,900 B1 * | 7/2009 | Vallance et al. | 60/528 |
| 2005/0115235 A1 * | 6/2005 | Mernoe | 60/527 |
| 2008/0278030 A1 * | 11/2008 | Hara et al. | 310/307 |
| 2008/0278590 A1 * | 11/2008 | Tanimura et al. | 348/208.99 |
| 2009/0133398 A1 * | 5/2009 | Hamaguchi | 60/527 |

FOREIGN PATENT DOCUMENTS

| | | |
|---|---|---|
| WO | WO 2004/009995 A1 | 1/2004 |

OTHER PUBLICATIONS http://www.fitec.co.jp/ftm/index2.htm, (Furukawa Techno Material Co., Ltd), 2004, which is the front page of item (1) above, together with an English-language version thereof.

European Search Report dated Jun. 8, 2006, for counterpart European Application No. EP 06 00 2549.

* cited by examiner

F I G. 5
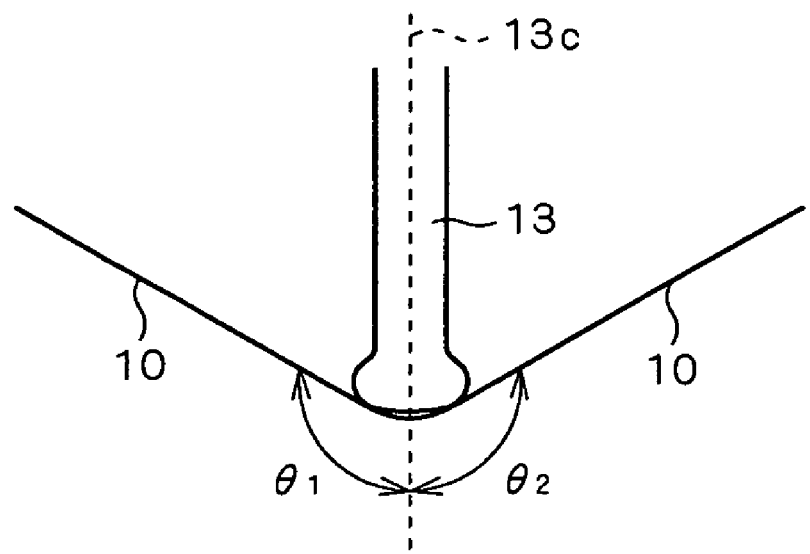
F I G. 6
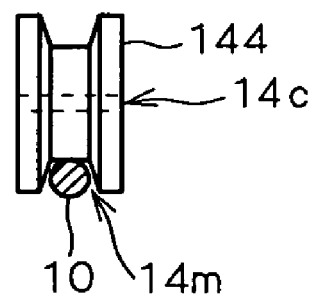

MANUFACTURING APPARATUS AND MANUFACTURING METHOD

This application is based on application No. 2005-034149 filed in Japan, the contents of which are hereby incorporated by reference.

BACKGROUND OF THE INVENTION

1. Field of the Invention

The present invention relates to a manufacturing technique capable of manufacturing a product in which a component having a predetermined length and made of a shape memory alloy is provided so as to be stretched.

2. Description of the Background Art

There is an actuator using the characteristics of a shape memory alloy (SMA) which regains its original shape when heated. As an example of the actuator using the SMA, there is an actuator which can operate by expansion and contraction of an SMA wire provided so as to be stretched.

The SMA wire has, however, the characteristic that it stretches in a stress application direction in a state where the elastic coefficient (elasticity value) is low. Consequently, at the time of stretching the SMA wire in assembly of an actuator, unintentional stretch occurs in the stress application direction. Since variations occur in the initial stretch or the displacement of the SMA wire at the time of heating in the actuator assembled in such a manner, there is a problem such that the quality of the actuator (product) deteriorates.

For example, in the case where an SMA wire 90 is fixed to a fixing part 92, fed from a guide 91, and stretched as shown in FIG. 18, if the guide 91 is moved in a direction of loosening the SMA 90 (the minus lead direction), the SMA 90 contracts. It causes torsion and hinders assembly of the actuator.

SUMMARY OF THE INVENTION

The present invention is directed to a manufacturing apparatus capable of manufacturing a product in which a component made of a shape memory alloy and having a predetermined length is stretched from a first fixing part to a second fixing part.

According to the present invention, the manufacturing apparatus includes: a stretcher part that holds a shape memory alloy in a tensioned state at least before the shape memory alloy is fixed to the first fixing part and the second fixing part; and a current feeder that passes current to the shape memory alloy in the tensioned state held by the stretcher, the shape memory alloy fixed to the product in the tensioned state being used as the component to produce the product. Therefore, a product in which a shape memory alloy is stretched can be manufactured with high quality.

In a preferred embodiment of the present invention, in the manufacturing apparatus, the stretcher has a guide which can move and/or rotate relative to the product, and guides and sends the shape memory alloy. Therefore, the shape memory alloy can be easily stretched.

The present invention is also directed to a manufacturing method of manufacturing a product in which a component made of a shape memory alloy having a predetermined length is stretched from a first fixing part to a second fixing part.

Therefore, an object of the present invention is to provide a manufacturing technique capable of manufacturing a product in which a shape memory alloy is stretched with high quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating the angle of an SMA sent from the guide;

FIG. 6 is a diagram illustrating a rotating member;

DESCRIPTION OF THE PREFERRED EMBODIMENTS

First Preferred Embodiment

Configuration of Actuator Assembling Apparatus

Prior to explanation of an actuator assembling apparatus (hereinafter, simply referred to as "assembling apparatus") 1 according to a first preferred embodiment of the present invention, an actuator (product) 8 manufactured by the assembling apparatus 1 serving as a manufacturing apparatus will be described.

Figure 1:
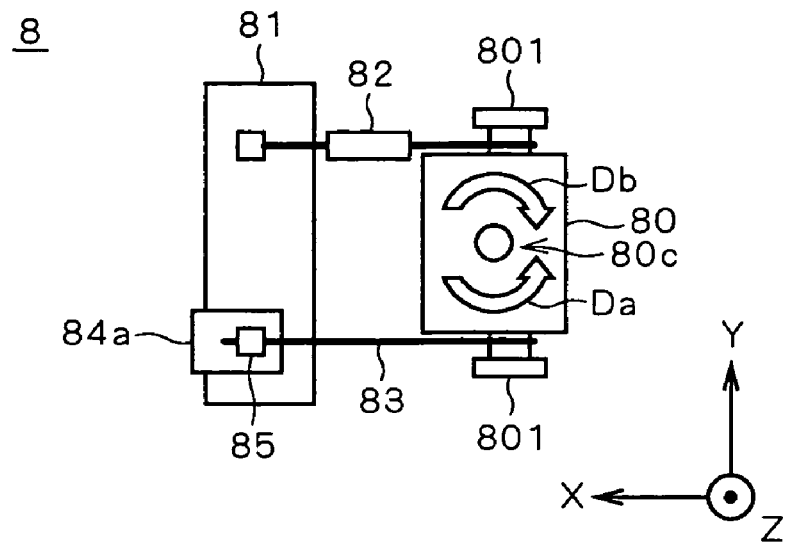
FIG. 1 is a diagram showing the configuration of a main part of an actuator manufactured by an assembling apparatus according to a first preferred embodiment of the present invention.
Figure 2:
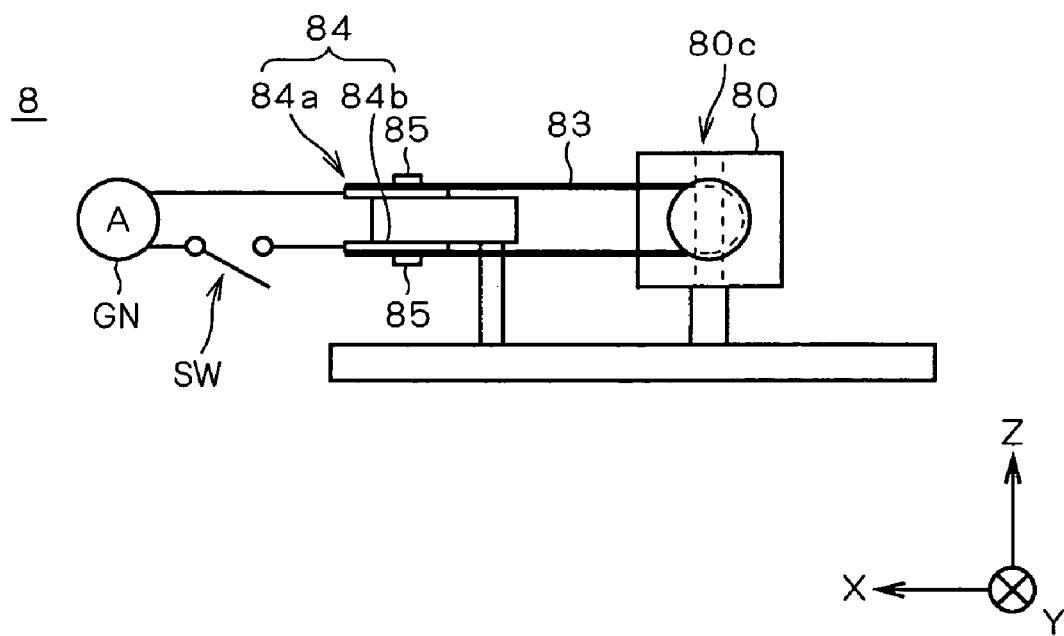
FIG. 2 is a diagram showing the configuration of a main part of the actuator.

FIGS. 1 and 2 are diagrams each showing the configuration of a main part of an actuator 8. FIGS. 1 and 2 are a top view and a side view, respectively, of the actuator 8.

The actuator 8 has a movable part 80 and a fixing part 81. Between the movable part 80 and the fixing part 81, a spring 82 and a shape memory alloy (SMA) 83 as parts are stretched.

The movable part 80 has a shaft 80c in its center and is movable around the shaft 80c as a center.

The SMA 83 is constructed as a wire that remembers a shape having a predetermined length (hereinafter, also referred to as "memorized length") and is looped around a projection 801 of the movable part 80. Both ends of the SMA 83 are fixed by caulking members 85 of upper and lower electrodes 84 (84a and 84b). That is, the SMA 83 is stretched as a component of the actuator 8 having a predetermined length between the electrode 84b (first fixing part) and the electrode 84a (second fixing part). Preferably, the diameter of the SMA 83 is 0.1 mm or less. When the SMA has a diameter exceeding 0.1 mm, the stress and shape are stabilized. Consequently, it becomes difficult to stretch the SMA due to rigidity of the wire, and response deteriorates because it takes time to increase/decrease the temperature at the time of passing current to regain the memorized length.

The upper electrode 84a is electrically directly connected to a current source GN, and the lower electrode 84b is connected to the power source via the switch SW.

With the configuration, in a state where the switch SW is off, a force is applied in a rotation direction Da by the biasing force of the spring 82 to the movable part 80, and is transmitted to the SMA 83. In the case where the ambient temperature of the SMA 83 corresponds to a temperature at which the elasticity value of the SMA 83 decreases, the SMA 83 stretches more than the memorized length. Consequently, the movable part 80 swings in the rotation direction Da.

On the other hand, when the switch SW is turned on to pass current to the SMA 83, the SMA 83 generates Joule heat by a resistance component of itself and starts regaining the memorized length by the generated heat. The SMA 83 which shrinks regains the memorized length at the stage that the elasticity value exceeds a high temperature state. In this case, a force in a rotation direction Db is applied to the movable part 80. When the force becomes larger than the biasing force of the spring 82, the movable part 80 swings in the rotation direction Db.

In the case of turning off the switch SW in the state where the SMA 83 is heated, the SMA 83 is cooled down by the ambient atmosphere, so that the SMA 83 enters a state where the elasticity value is low and starts stretching by the biasing force of the spring 82. In the case where the SMA 83 is cooled down to a temperature at which the elasticity value of the SMA 83 becomes the smallest, stretch of the SMA 83 becomes the maximum and the SMA 83 swings in the rotation direction Da.

By performing heating by passage of current to the SMA 83 or natural cooling, the movable part 80 can swing around the shaft 80c as a center. The operation of the movable part 80 is determined by the tension applied to the SMA 83 looped over the projection 801 of the movable part 80, so that it is necessary to properly adjust the tension of the SMA 83 at the time of manufacture in order to obtain a planned movement amount in the movable part 80. On the other hand, in order to improve response of the movable part 80 in the manufactured actuator 8, it is also important that the SMA 83 has a predetermined tension.

As described above, at the time of manufacturing the actuator 8 in which the SMA 83 is stretched in the movable part 80, it is important to adjust the tension. The assembling apparatus 1 capable of easily performing the tension adjustment will be described below.

Figure 3:
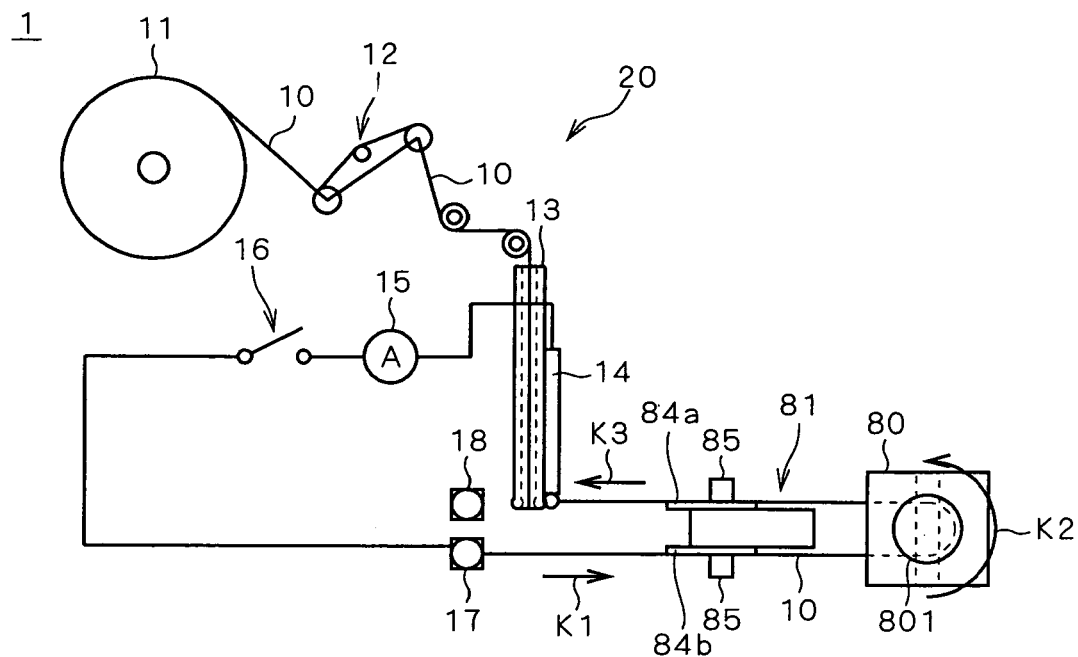
FIG. 3 is a diagram showing the configuration of a main part of the assembling apparatus.

FIG. 3 is a diagram showing the configuration of a main part of the assembling apparatus 1.

The assembling apparatus 1 has a roll 11 around which an SMA 10 as the material of the SMA 83 (FIG. 1) stretched in the actuator 8 is wound. The assembling apparatus 1 also has a stretching part (stretcher) 20 which includes a tension adjuster 12 for giving a tension to the SMA 10 supplied from the roll 11, and the guide 13 for guiding and sending the SMA 10 from the tension adjuster 12. The guide 13 can move or turn relative to the actuator being manufactured and, by such an operation, the SMA 10 can be stretched in the movable part 80. In this case, a predetermined tension is given to the SMA 10 by the tension adjuster 12 before the entrance of the guide 13 into which the SMA 10 is sent, so that the SMA 10 can be properly stretched.

The assembling apparatus 1 also has an electrode (current passing part) 14 provided in the vicinity of the guide 13 in order to pass current to the SMA 10, a current source 15 for supplying power to the electrode 14, and a switch 16 for switching on/off the current passage from the current source 15. Further, the assembling apparatus 1 has first and second holders 17 and 18 for holding the SMA 10 at the time of stretching the SMA 10 in the movable part 80. The first holder 17 is electrically connected to the current source 15 via the switch 16.

Figure 4:
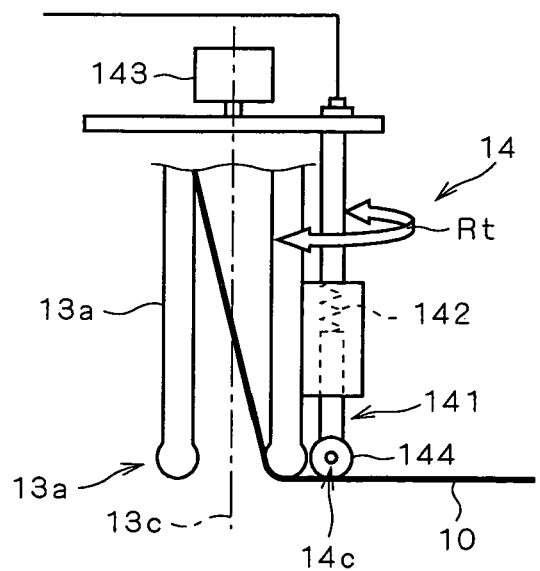
FIG. 4 is a diagram illustrating a portion around the lower part of a guide.

FIG. 4 is a diagram showing a portion around the lower part of the guide 13.

The guide 13 has a cylindrical shape and an exit opening part 13a is constructed as a curved surface. Preferably, the opening area of the exit opening part 13a is at least twice as large as the sectional area of the SMA 10 for the reason that, in the case of the opening area (gap) less than twice as large as the sectional area of the SMA 10, friction occurs in the exit part, and stress more than necessary is generated.

Preferably, the radius of curvature of the exit opening part 13a is at least five times as large as the diameter (thickness) of the SMA 10 to be stretched. Generally, when a wire material is bent at a curvature which is less than five times as large as the diameter of the wire, contraction/expansion of about 10% or higher occurs on the inside and outside of the wire material. Due to the displacement difference between the outside and the inside, the memorizing capability of the SMA deteriorates and the material is damaged. Therefore, the preferable radius of curvature of the exit opening part 13a is five times or more of the diameter of the SMA 10. Considering a stretch according to the shape of the actuator 8, preferably, each of angles θ1 and θ2 (FIG. 5) between the center axis 13c of the guide 13 and the SMA 10 sent from the exit of the guide 13 lies in the range from 0 to 120 degrees. In other words, when the SMA 10 is bent at an angle exceeding 120 degrees, stress applied to the SMA 10 becomes excessive. It is therefore desirable that the angle of bending the SMA 10 in the exit opening 13a is 120 degrees or less.

If the surface hardness of the guide 13 is lower than that of the SMA 10, wear occurs due to friction, so that the guide 13 is made of a metal or ceramic as a material having surface hardness higher than that of the SMA 10.

The electrode 14 has a contact part 141 which comes into contact with the SMA 10 sent from the exit of the guide 13 and a biasing part 142 which gives a biasing force to make the contact part 141 come into contact with the SMA 10 with high reliability. From the electrode 14 having such a configuration, current is passed only to the SMA 10 sent from the guide 13 and positioned far from the contact part 141.

The contact part 141 has a conductive rotating member 144 (FIG. 6) which can rotate around a rotary shaft 14c as a center at its tip which comes into contact with the SMA 10. In the rotating member 144, a groove 14m for holding the SMA 10 so that the SMA 10 does not come off when the SMA 10 is sent. With such a configuration, the SMA 10 fed from the guide 13 is sent by a rotating roller (rotating member 144), so that contact resistance to the SMA 10 can be suppressed and application of excessive stress to the SMA 10 can be prevented.

The electrode 14 also has a rotating part 143 for rotating the contact part 141 and the biasing part 142 in a rotation direction Rt by using, for example, a pulse motor. The guide 13 moves and turns in a process of stretching the SMA 10 as will be described later and the direction of sending the SMA 10 also changes. According to the change in the direction, the direction of the contact part 141 with respect to the guide 13 has to be also changed. By making the contact part 141 swing relatively around the center axis 13*c* of the guide 13 as a center by the rotating part 143, the operation of stretching the SMA 10 can be performed smoothly.

Assembly of Actuator 8 by Assembling Apparatus 1

The procedure of assembling the actuator 8 by using the assembling apparatus 1 having the above-described configuration, particularly, the procedure of stretching the SMA 10 will be described below with reference to FIG. 3.

(1) First, the SMA 10 sent from the guide 13 is locked by the first holder 17.

(2) Second, while sending the SMA 10, the guide 13 is automatically moved along movement directions K1 to K3 in order from the lower electrode 84*b*, the projection 801 of the body 80, and the upper electrode 84*a*. In this case, a predetermined tension is given to the SMA 10 by the tension adjuster 12. In a case such that the SMA 10 is provided so as to loop around the projection 801, the contact part 141 which comes into contact with the SMA 10 is properly rotated by the rotating part 143.

(3) The SMA 10 sent from the guide 13 is locked by the second holder 18.

(4) The SMA 10 is fixed to the electrodes 84*a* and 84*b* by the caulking members 85. The unnecessary SMA 10 from the electrodes 84 to the first and second holders 17 and 18 are cut by, for example, a cutter. By cutting the SMA 10 in the tensioned state after it is fixed to the actuator, an SMA 83 as a component of the actuator 8 is created, and the actuator 8 is manufactured.

In the processes (1) to (3), for the whole period (or part of the period) in which the SMA 10 is sent from the guide 13, the switch 16 is turned on to pass current to the SMA 10 from the electrode 14. That is, the SMA 10 is held in the tensioned state at least just before the SMA 10 is fixed to the electrodes 84*a* and 84*b*, and current is passed to at least a portion in the SMA 10 corresponding to the interval from the electrode 84*b* to the electrode 84*a* in the tensioned state. After the SMA 10 is fixed to the actuator, the passage of current to the SMA 10 is cancelled.

Since the SMA 10 is stretched in the state where the SMA 10 has the elastic coefficient (elasticity value) higher than that of the SMA 10 to which current is not passed, concretely, the SMA 10 has the elastic coefficient when the SMA 10 regains the memorized shape or a value close to the elastic coefficient, the stretch of the SMA 10 becomes extremely small and the SMA 10 can be properly stretched. In this case, it is also possible to stretch the SMA under a constant tension by controlling a heat generation amount by adjusting current that is passed to the SMA 10.

With the assembling apparatus 1 as described above, by passing current to the SMA at the time of stretching the SMA in the actuator, a state where the elasticity value is high can be obtained. Consequently, the SMA can be stably stretched. As a result, the actuator can be manufactured with high quality.

Figure 7:
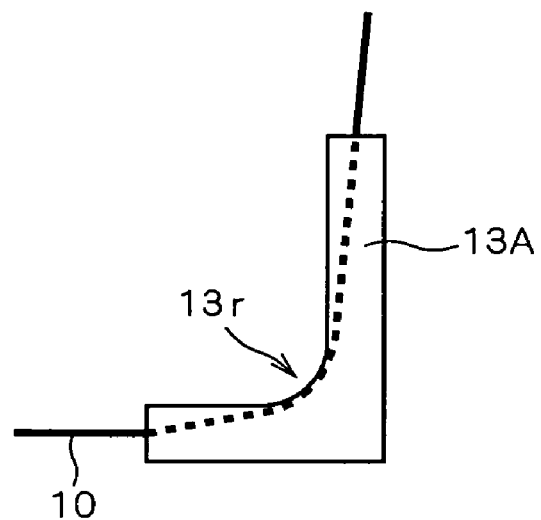
FIG. 7 is a diagram illustrating a guide.

In the assembling apparatus 1, it is not indispensable to use the guide 13 having the shape shown in FIG. 4. Alternatively, a guide 13A shown in FIG. 7 may be used. The guide 13A has a curved surface part 13*r* before the exit. With the configuration, the SMA 10 can maintain a flexible state until it goes out from the exit of the guide 13.

Figure 8:
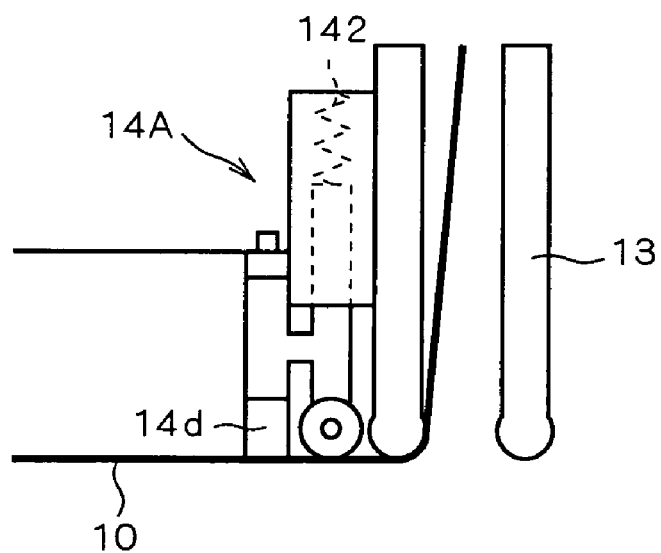
FIG. 8 is a diagram illustrating an electrode.

In the assembling apparatus 1, it is not indispensable to provide the electrode 14 as shown in FIG. 4. Alternatively, an electrode 14A shown in FIG. 8 may be provided. The electrode 14A has a contact part 14*d* which comes into contact with the SMA 10 and is disposed not just below the biasing part 142 but apart from the guide 13.

Figures 9A, 9B, 9C, 9D:
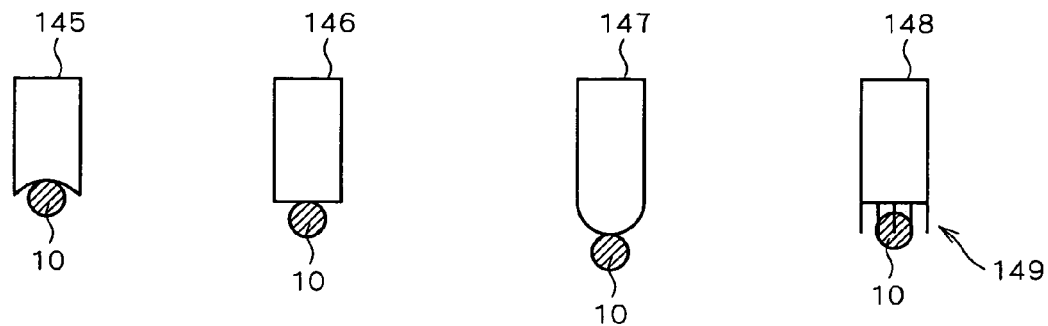
FIGS. 9A to 9D are diagrams illustrating members of the electrode which comes into contact with the SMA.

The contact part of the electrode 14 in the assembling apparatus 1 does not always have to have the rotating member (roller-shaped member) 144 having the shape shown in FIG. 6 but may have any of conductive members 145 to 147 shown in FIGS. 9A to 9C each having a smoothed surface along which the SMA 10 slides, and a conductive member 148 having a brush shape shown in FIG. 9D.

The member 145 has a concave surface on which the SMA 10 slides so that the SMA 10 sent can be prevented from coming off from the member 145.

Figure 10:
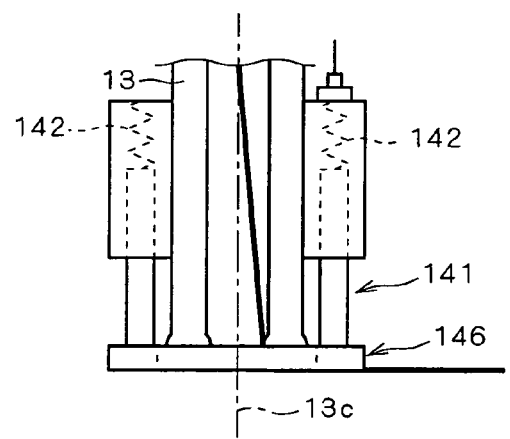
FIG. 10 is a diagram illustrating a member in the electrode.

The member 146 has a flat surface on which the SMA 10 slides and is formed as a member of a ring shape using the center axis 13*c* of the guide 13 as a center as shown in FIG. 10. In the configuration shown in FIG. 10, the rotating part 143 shown in FIG. 4 is also unnecessary.

The member 147 has a convex surface on which the SMA 10 slides and is formed in a ring shape in a manner similar to the member 146. With the configuration, the member 147 and the SMA 10 are in point-contact with each other, so that friction with the SMA 10 can be reduced.

The member 148 has, at its end, a brush 149 which comes into contact with the SMA 10. With the configuration, friction with the SMA 10 can be reduced.

The assembling apparatus 1 is effective for the work of stretching the SMA 10 without changing the relative positions in the case where the movable part 80 and the fixing part 81 are manufactured independently of each other like the actuator 8 shown in FIGS. 1 and 2. It is also effective for a work of stretching the SMA 10 without changing the relative positions in the case where the movable part 80 and the fixing part 81 are integrally manufactured like an actuator 8A shown in FIGS. 11 and 12.

The actuator 8A is manufactured in a state where the movable part 80 and the fixing part 81 are coupled to each other via a coupling part 86. The SMA 83 is stretched by using the assembling apparatus 1 and, after that, the coupling part 86 is cut along a cut plane CT. By the operation, the actuator 8A functions as an actuator.

Figure 13:
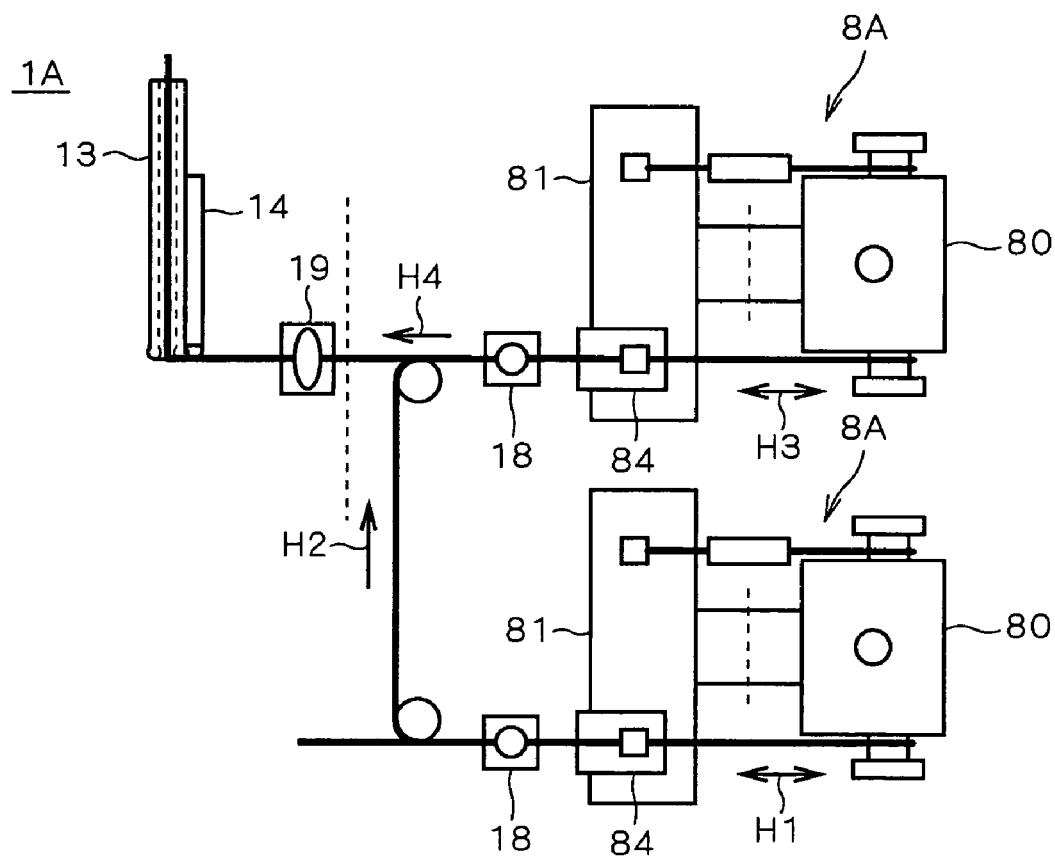
FIG. 13 is a diagram showing the configuration of a main part of an assembling apparatus.

Further, it is not indispensable to assemble actuators one by one by using the assembling apparatus 1 but a plurality of actuators may be simultaneously assembled. In this case, for example, the assembling apparatus 1A shown in FIG. 13 is used.

The assembling apparatus 1A is obtained by adding a holder 19 for holding the SMA 10 to the assembling apparatus 1 (FIG. 3). Also in the case where the stretching of the SMA 10 completes and the SMA 10 is fixed in the actuator and, after that, even when an unnecessary part of the SMA 10 is cut off by cutting means (not shown) that for example, can pass high current and generate heat to the range of the SMA 10 positioned between the actuator and the holder 19, the holder 19 holds the SMA 10 so that the tip of the SMA 10 sent from the guide 13 does not become free until manufacture of the next actuator starts.

Figure 11:
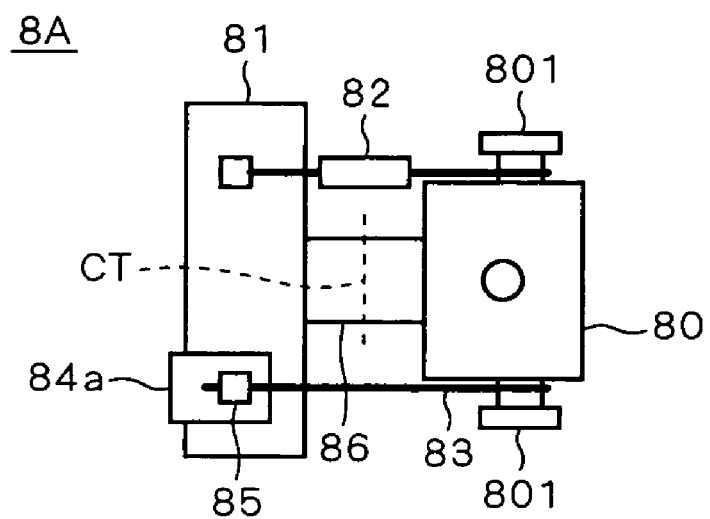
FIG. 11 is a diagram showing the configuration of a main part of an actuator.
Figure 12:
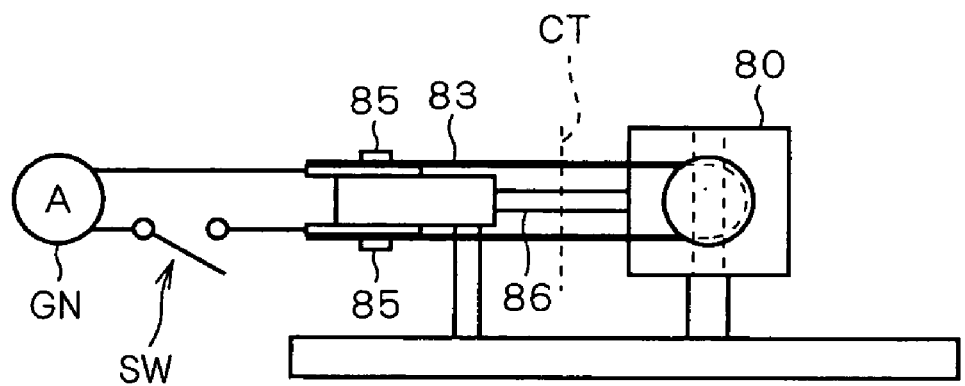
FIG. 12 is a diagram showing the configuration of a main part of the actuator.

In the case of manufacturing two actuators 8A shown in FIGS. 11 and 12 as an example by using the assembling apparatus 1A, the guide 13 is moved in movement directions H1, H2, H3, and H4 in order while passing current from the electrode 14 to the SMA 10. After the SMA 10 is fixed to the electrode 84, an unnecessary part is cut off, thereby completing assembly of the two actuators 8A.

In the assembling apparatus 1, by stretching the SMA 10 in the following second actuator 8A (on the upper side in FIG. 13) without cutting the SMA 10 after the stretch of the SMA 10 in the first actuator 8A (on the lower side in FIG. 13) completes and the SMA 10 is fixed to the actuator 8A, productivity can be improved.

Figure 14:
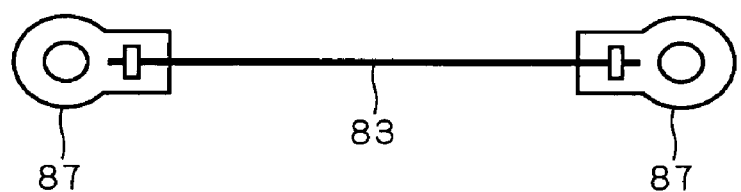
FIG. 14 is a diagram showing the configuration of a main part of an actuator.

In assembly of the actuator, an SMA component 8B (FIG. 14) in which the movable part 80 and the fixing part 81 as shown in FIGS. 1 and 2 are not provided may be applied. The SMA component 8B has a configuration that the SMA 83 is stretched across two annular members 87.

Figure 15:
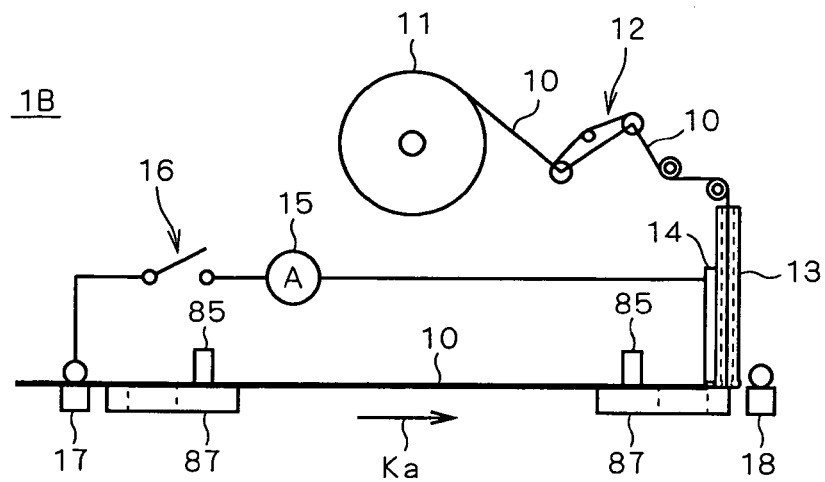
FIG. 15 is a diagram showing the configuration of a main part of an assembling apparatus.

In the case of assembling the SMA component 8B, the assembling apparatus 1B shown in FIG. 15 is used. The assembling apparatus 1B has a configuration similar to that of the assembling apparatus 1 shown in FIG. 3. In FIG. 15, the same reference symbols are designated to parts having functions similar to those of the assembling apparatus 1.

Also in the assembling apparatus 1B having the above-described configuration, in the case of locking the SMA 10 by the first holder 17 and moving the guide 13 in the movement direction Ka to stretch the SMA 10, current is passed to the SMA 10 by the electrode 14. Since the SMA component 8B assembled in such a manner does not stretch much and no torsion occurs, it facilitates the following assembly to an actuator or the like.

Second Preferred Embodiment

In the first preferred embodiment, the tension of the SMA is adjusted at the time of assembling the actuator. In the second preferred embodiment, the tension of the SMA stretched in the actuator is adjusted. The tension adjusting apparatus 2 used in the second preferred embodiment will be described below.

Figure 16:
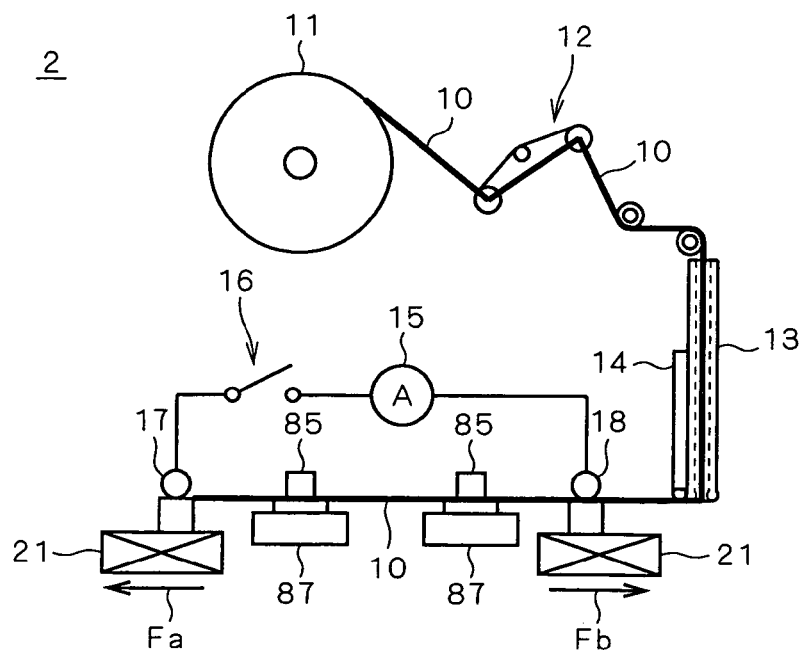
FIG. 16 is a diagram showing the configuration of a main part of a tension adjusting apparatus according to a second preferred embodiment of the present invention.

FIG. 16 is a diagram showing the configuration of a main part of the tension adjusting apparatus 2 according to the second preferred embodiment of the present invention.

The tension adjusting apparatus 2 has a configuration similar to that of the assembling apparatus 1B shown in FIG. 15 except for the point that two tension adjusters 21 are added. In FIG. 16, the same reference symbols are designated to parts having functions similar to those of the assembling apparatus 1B.

The tension adjusters 21 are parts connected to the first and second holders 17 and 18 and pulling the holders 17 and 18 in the left direction Fa and the right direction Fb, respectively, by using, for example, spring force to adjust the tension of the SMA 10. The tension adjuster (second tension applying means) 21 has a role different from that of the tension adjuster (first tension applying means) 12 for applying a tension to the SMA 10 in front of the entrance of the guide 13 for the period in which the SMA 10 is sent from the guide 13 and the actuator is assembled. The tension adjusters 21 have the role of applying a tension to the SMA 10 in positions far from the exit of the guide 13 for at least the period since the sending of the SMA 10 from the guide 13 is finished and assembly of the actuator is completed until the SMA 10 is fixed. Consequently, the set value of tension (tension value) in the tension adjuster 21 is set to be larger than the tension value of the tension adjuster 12 which applies the minimum tension at the time of stretching the SMA 10.

In the tension adjusting apparatus 2 having the above-described configuration, tension of the SMA 10 is adjusted by the following procedure.

First, the SMA 10 is stretched from the first holder 17 as the starting point to the second holder 18 as the end point. After the SMA 10 is locked by the second holder 18, the switch 16 is turned on to pass predetermined current from the current source 15 to the SMA 10, thereby causing austenite transformation in the SMA 10.

Next, by the tension adjusters 21 connected to the first and second holders 17 and 18, the SMA 10 is pulled in the right and left directions Fb and Fa, thereby adjusting the tension.

After completion of the tension adjustment by the tension adjusters 21, the SMA 10 is fixed by the caulking members 85, and the unnecessary SMA 10 from the caulking members 85 to the first and second holders 17 and 18 are cut with, for example, a blade. Alternatively, the unnecessary part of the SMA 10 may be cut off by passing high current to a small range in the SMA 10 so as to melt the range. After cutting the unnecessary part, the SMA 10 is held until assembly of the next actuator starts without releasing the SMA 10 from the second holder 18. Thus, the SMA 10 sent from the guide 13 does not become free and it is preferable.

By using the tension adjusting apparatus 2 as described above, since current is passed to the SMA 10 in the tensioned state for the period from completion of sending of the SMA 10 from the guide 13 until the SMA 10 is fixed to the actuator, the tension of the SMA 10 stretched can be properly adjusted. As a result, the high-quality actuator capable of performing stable operation can be manufactured.

It is not indispensable for the tension adjuster 21 of the tension adjusting apparatus 2 to adjust the tension of the SMA by using the spring force. The tension may be adjusted by using an actuator such as a motor. In this case, by adjusting the tension while measuring tension of the SMA, the SMA can be stretched under a desired tension with high precision. Alternatively, tension adjustment may be performed by measuring the length of the SMA stretched in the actuator in place of measuring the tension of the SMA.

Modifications

Figure 17:
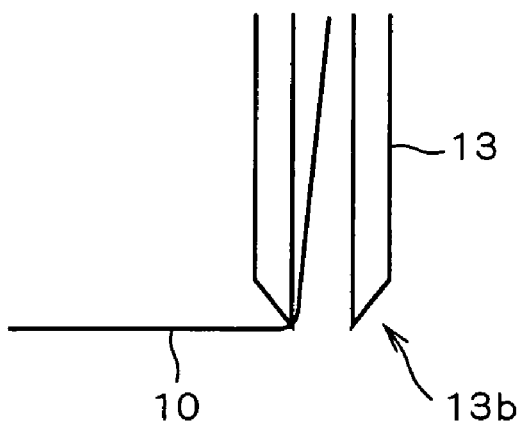
FIG. 17 is a diagram illustrating an exit opening part in the guide of a modification of the present invention.
Figure 18:
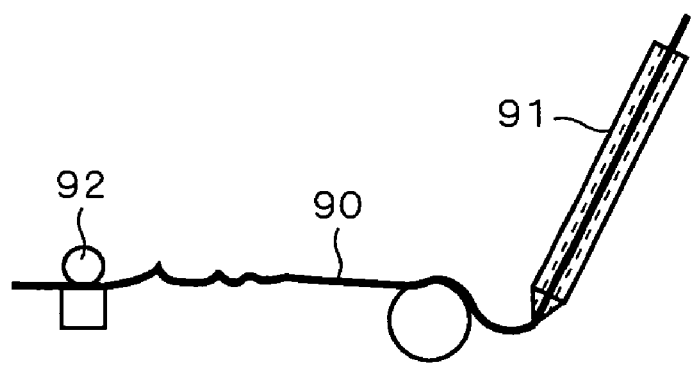
FIG. 18 is a diagram illustrating providing of an SMA in a tensioned state according to a conventional technique.

The guide in each of the foregoing preferred embodiments does not always have to have the exit opening 13a constructed in the curved surface as shown in FIG. 4 but may have a pointed exit opening 13b as shown in FIG. 17.

In the foregoing preferred embodiments, it is not indispensable to attach a wire (line) shaped SMA to an actuator. Foil such as a thin film having an elongated square shape may be attached.

The contact part of the electrode in each of the foregoing preferred embodiments may not be constructed as a member separate from the guide 13 like the contact 141 shown in FIG. 4 but may be formed as part of the guide part 13 or the entire guide part 13 which is electrically conductive.

The tension adjuster 12 in each of the foregoing preferred embodiments may pull the SMA 10 for a predetermined length so that the SMA 10 is provided in a tensioned state.

While the invention has been shown and described in detail, the foregoing description is in all aspects illustrative and not restrictive. It is therefore understood that numerous modifications and variations can be devised without departing from the scope of the invention.

What is claimed is:

1. A manufacturing apparatus capable of manufacturing a product in which a component made of shape memory alloy and having a predetermined length is stretched from a first fixing part to a second fixing part, comprising:
   a stretcher that holds a shape memory alloy in a tensioned state at least before said shape memory alloy is fixed to said first fixing part and said second fixing part; and
   a current feeder that passes current to said shape memory alloy in said tensioned state held by said stretcher, said shape memory alloy fixed to said product in said tensioned state being used as said component to produce said product, wherein said stretcher has a guide which can move and/or rotate relative to said product, and guides and sends said shape memory alloy, said guide has a cylindrical shape having an exit opening part from which said shape memory alloy is sent, said exit opening part includes a curved surface having radius curvature which is at least five times as large as a thickness of said shape memory alloy, and an opening area of said exit opening part is at least twice as large as a sectional area of said shape memory alloy.

2. The manufacturing apparatus according to claim 1, wherein
a flexion angle of said shape memory alloy in said exit opening part is 120 degrees or less.

3. The manufacturing apparatus according to claim 1, wherein
said guide is made of a metal or ceramic having surface hardness higher than that of said shape memory alloy.

4. The manufacturing apparatus according to claim 1, wherein
said shape memory alloy sent from said guide is sent by a roller which rotates.

5. The manufacturing apparatus according to claim 1, wherein
said shape memory alloy is formed as a wire having a diameter of 0.1 mm or less.

6. The manufacturing apparatus according to claim 1, wherein
said current feeder passes current to said shape memory alloy for a predetermined period out of a period in which said shape memory alloy is sent from said guide.

7. The manufacturing apparatus according to claim 1, wherein
said current feeder passes current to said shape memory alloy for a period from completion of sending of said shape memory alloy from said guide until said shape memory alloy is fixed to said product.

8. The manufacturing apparatus according to claim 1, wherein
said stretcher has a tension applying part that applies a predetermined tension to said shape memory alloy so that said shape memory alloy enters said tensioned state before an entrance of said guide into which said shape memory alloy is sent.

9. The manufacturing apparatus according to claim 1, wherein
said stretcher has a pulling part for pulling said shape memory alloy for a predetermined length so that said shape memory alloy enters said tensioned state before an entrance of said guide into which said shape memory alloy is sent.

10. The manufacturing apparatus according to claim 1, wherein
said shape memory alloy to which current is passed from said current feeder has an elastic coefficient higher than that of said shape memory alloy to which no current is passed.

11. The manufacturing apparatus according to claim 10, wherein
said elastic coefficient of said shape memory alloy to which current is passed is equal or close to an elastic coefficient obtained when said shape memory alloy has regained a memorized shape.

12. The manufacturing apparatus according to claim 1, wherein after said shape memory alloy has been fixed to said product, said current feeder stops passage of current to said shape memory alloy.

13. The manufacturing apparatus according to claim 1, wherein
said shape memory alloy sent from said guide is not allowed to be free for a period since said shape memory alloy in said tensioned state has been fixed to the product until manufacture of a next product starts.

14. The manufacturing apparatus according to claim 13, further comprising:
a holder that holds said shape memory alloy sent from said guide after said shape memory alloy has been fixed to said product in said tensioned state.

15. The manufacturing apparatus according to claim 14, wherein
after said shape memory alloy has been held by said holder, said shape memory alloy is cut between said product and said holder.

16. The manufacturing apparatus according to claim 13, wherein
after said shape memory alloy in said tensioned state has been fixed to said product, manufacture of said next product is started without cutting said shape memory alloy.

17. A manufacturing apparatus capable of manufacturing a product having a shape memory alloy component of a predetermined length that is stretched from a first fixing part to a second fixing part of said product, said manufacturing apparatus comprising:
a stretcher that is configured to hold a shape memory alloy in a tensioned state at least before said shape memory alloy is fixed to said first fixing part and said second fixing part of said product; and
a current feeder that is configured to pass current to said shape memory alloy being held in said tensioned state by said stretcher until said shape memory alloy is fixed to said product,
wherein said stretcher includes a guide which can move and/or rotate to align with said product, and
said current feeder is configured to pass current to at least a portion of said shape memory alloy corresponding to an interval from said first fixing part to said second fixing part.

18. The manufacturing apparatus according to claim 17, wherein
said current feeder has a contact part which comes into contact with said shape memory alloy sent from said guide, and
current is passed by said current feeder only to said shape memory alloy far from said contact part, which is sent from said guide.

19. The manufacturing apparatus according to claim 18, wherein
said contact part is formed as part or whole of said guide which is electrically conductive.

20. The manufacturing apparatus according to claim 18, wherein
said contact part is formed as a conductive member having a roller shape, a brush shape, or a smoothed surface.

21. The manufacturing apparatus according to claim 17, wherein
said guide is made of a metal or ceramic having surface hardness higher than that of said shape memory alloy.

22. The manufacturing apparatus according to claim 17, wherein said shape memory alloy sent from said guide is sent by a roller which rotates.

23. The manufacturing apparatus according to claim 17, wherein said shape memory alloy is formed as a wire having a diameter of 0.1 mm or less.

24. The manufacturing apparatus according to claim 17, wherein
said stretcher has a tension applying part that applies a predetermined tension to said shape memory alloy before said shape memory alloy enters said guide.

25. A manufacturing apparatus capable of manufacturing a product in which a component made of shape memory alloy and having a predetermined length is stretched from a first fixing part to a second fixing part, comprising:
a stretcher that holds a shape memory alloy in a tensioned state at least before said shape memory alloy is fixed to said first fixing part and said second fixing part; and
a current feeder that passes current to said shape memory alloy in said tensioned state held by said stretcher, said shape memory alloy fixed to said product in said tensioned state being used as said component to produce said product,
wherein said stretcher has a guide which can move and/or rotate relative to said product, and guides and sends said shape memory alloy, and
wherein said stretcher further includes:
a first tension applying part that applies a tension to said shape memory alloy before an entrance of said guide into which said shape memory alloy is sent at least for a period in which said shape memory alloy is sent from said guide; and
a second tension applying part that applies a tension to said shape memory alloy far from an exit of said guide from which said shape memory alloy is sent at least for a period from completion of sending of said shape memory alloy from said guide until said shape memory alloy is fixed to said product.

26. The manufacturing apparatus according to claim 25, wherein
a tension value given by said second tension applying part is larger than a tension value given by said first tension applying part.

27. The manufacturing apparatus according to claim 25, wherein
said guide is made of a metal or ceramic having surface hardness higher than that of said shape memory alloy.

28. The manufacturing apparatus according to claim 25, wherein said shape memory alloy sent from said guide is sent by a roller which rotates.

29. The manufacturing apparatus according to claim 25, wherein said shape memory alloy is formed as a wire having a diameter of 0.1 mm or less.

30. The manufacturing apparatus according to claim 25, wherein said current feeder passes current to said shape memory alloy until said shape memory alloy is fixed to said product.

31. The manufacturing apparatus according to claim 25, wherein
said stretcher has a tension applying part that applies a predetermined tension to said shape memory alloy before said shape memory alloy enters said guide.

* * * * *